C. B. MOREHOUSE,

Ass'nr to E. CHAMBERLIN & J. O. MERRIAM.

Devices for Clamping Whip-Sockets to Vehicles.

No. 5,713. Reissued Dec. 30, 1873.

WITNESSES:
P. C. Dieterich.
C. H. Watson

INVENTOR
Edwin Chamberlin
John O. Merriam
per T. H. Alexander & Co
ATTORNEYS.

A.M. PHOTO-LITHOGRAPHIC Co. N.Y. (OSBORNE'S PROCESS)

UNITED STATES PATENT OFFICE.

CHARLES B. MOREHOUSE, OF NEWCASTLE, INDIANA, ASSIGNOR, BY MESNE ASSIGNMENTS, TO EDWIN CHAMBERLIN AND JOHN O. MERRIAM.

IMPROVEMENT IN DEVICES FOR CLAMPING WHIP-SOCKETS TO VEHICLES.

Specification forming part of Letters Patent No. 43,858, dated August 16, 1864; reissue No. 5,235, dated January 14, 1873; reissue No. 5,713, dated December 30, 1873; application filed October 13, 1873.

*To all whom it may concern:*

Be it known that CHARLES B. MOREHOUSE, of Newcastle, county of Henry and State of Indiana, has invented certain new and useful Improvements in Whip-Sockets, which are simple in construction, convenient and efficient in operation, and durable in use.

They consist in providing a whip-socket with a fastening device, one part of which furnishes a rest or seat for the dash-rail or other part of the vehicle, to which the socket may be attached, and the other part being movable to receive and clamp the said dash-rail or other part of the vehicle, the parts being clamped together by suitable means. They also consist in the combination of the parts, as hereinafter more fully described.

The following is a full, clear, and exact description of the principles of the invention, which will enable others skilled in the art to which it appertains to make and use the same, reference being had to the accompanying drawing forming a part of this specification, in which—

Figure 1:
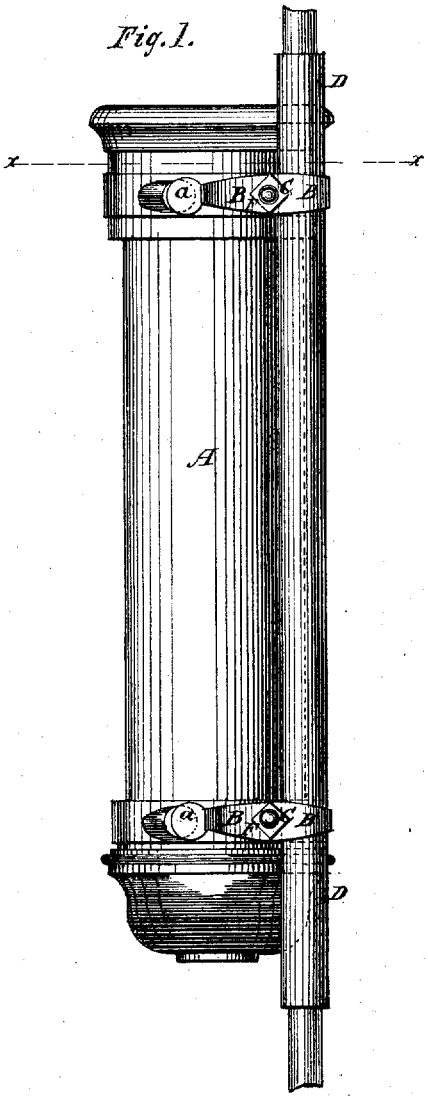
Figure 2:
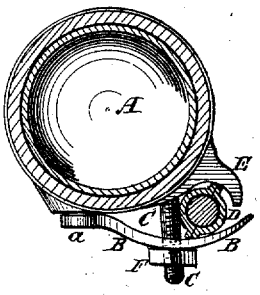

Figure 1 represents a side elevation of a device embodying my invention; and Fig. 2 represents a section of the same taken through line *x x*, Fig. 1.

A represents a whip-socket of any desired, suitable, or convenient form, having one or more projections, E, attached to or rigidly secured thereon, and forming a suitable support or bearing for a dash-rail, D, or other suitable part of the carriage. B represents a jaw resting upon the projection E at one end, the other partially embracing the dash-rail D, and secured or clamped in position by a rod, C, and nut F, said rod C being secured to or forming a part of the projection E, and passing through the jaw B. The said rod C is placed in such position that when the parts are clamped in position, as shown, the rod forms of itself a bearing for one side of the dash-rail D, or other part of the vehicle to which the socket may be attached. The outer end of the rod C is provided with a screw-thread to receive the nut F, by which means the parts may be securely clamped in position or removed, at pleasure. The jaw B and projection E are made concave on their inner faces where the dash-rail is received, and the movable jaw allows the device to be used upon rails of different sizes.

Having thus fully described the invention, what is claimed, and desired to be secured by Letters Patent, is—

1. In combination with a whip-socket, a fastening device, having a support or bearing, E, and a movable jaw, between which the dash-rail or other part of the vehicle is received and securely clamped, for the purpose specified.

2. In combination with a whip-socket, a clamp or fastening for securing the same to the dash-rail, the parts which form said clamp being concave upon their contiguous or facing sides, and adapted by means of a screw to receive and be secured to rails of different sizes, as set forth.

EDWIN CHAMBERLIN.
JOHN O. MERRIAM.

Witnesses:
ANSON SEARLS,
G. H. SAGENDORF.